United States Patent

[11] 3,623,596

[72] Inventor Francis J. Garvey
 Newfield, N.J.
[21] Appl. No. 8,854
[22] Filed Feb. 5, 1970
[45] Patented Nov. 30, 1971
[73] Assignee Garvey Products Corporation
 Blue Anchor, N.J.

[54] ACCUMULATING TABLE
 9 Claims, 11 Drawing Figs.
[52] U.S. Cl. .................................................. 198/103
[51] Int. Cl. .................................................. B65g 37/00
[50] Field of Search .......................................... 198/209,
 211, 30, 103, 104, 105, 107, 25; 272/46

[56] References Cited
UNITED STATES PATENTS
3,071,376 1/1963 Ernst ............................ 198/103

Primary Examiner—Richard E. Aegerter
Attorney—Albert H. Kirchner

ABSTRACT: In a rotary accumulating table, a relatively thin and flexible metallic disk is rotated on a vertical axis and at its point of tangency to a supply conveyor peripherally spaced rollers bear respectively on the upper and under surfaces of the disk to flex its margin into accurate coplanar level with the conveyor surface. The disk is supported by a set of other rollers which are peripherally spaced around the disk margin and are mounted on radially directed brackets which are interchangeable in different lengths to permit ready substitution of disks of different diametric sizes.

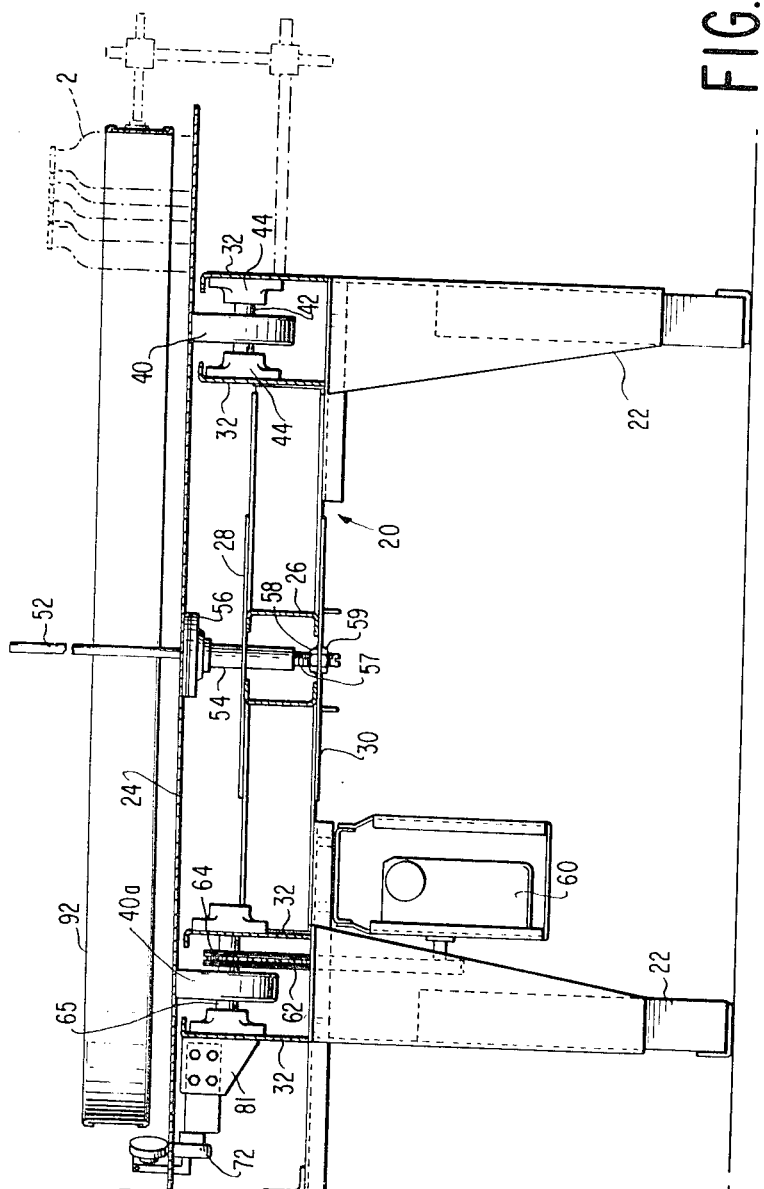

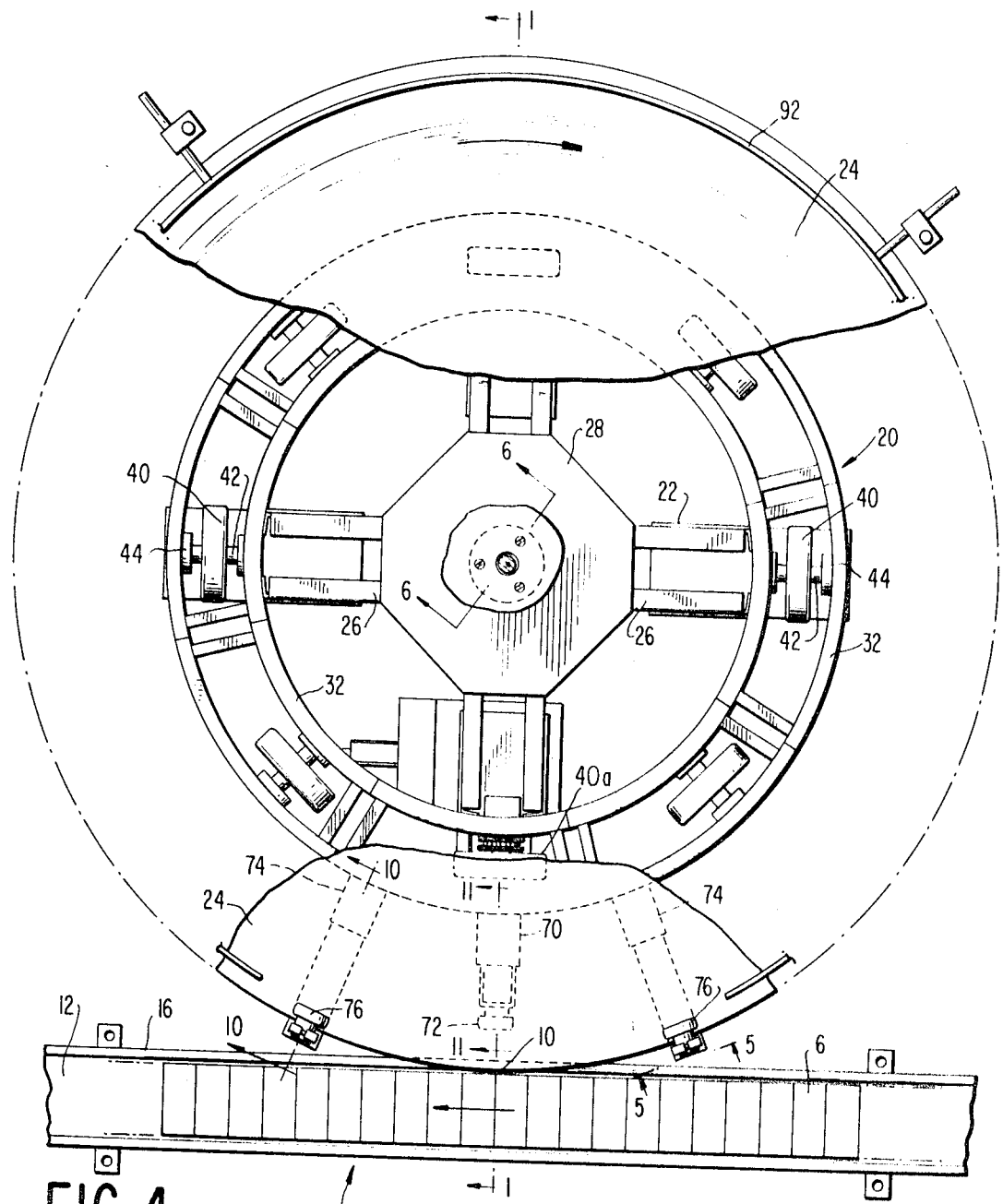
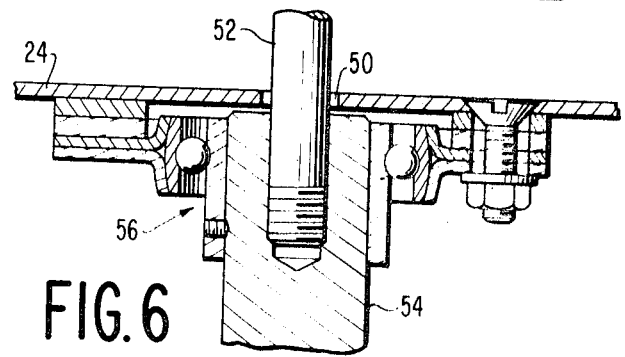
FIG. 4
FIG. 5
FIG. 6

3,623,596

ACCUMULATING TABLE

BACKGROUND OF THE INVENTION

The invention relates generally to conveyor systems and particularly to those in which a long series of individual articles are moved along an endless belt-type conveyor between manufacturing or processing steps or stations. The desired steady continuous movement of the articles is sometimes temporarily interrupted for various reasons, such as mechanical failure at one of the stations, or inattention or an error of some kind by operating personnel. In such cases it becomes necessary, in order to avoid shutdown of the entire system, to relieve the pressure of continually oncoming articles by shunting some of them off the conveyor onto an accumulating table where they can be held for a time and from which they can be returned to the system upon restoration of normal operation.

Prime examples of such systems are some of the kinds used in the manufacture of glass containers and similar ware, in the filling and sealing of containers with foods, beverages and other commodities for retail merchandising, the supplying of component parts to an assembly line or station, and indeed substantially any kind of conveyor handling individual articles or elements where interruption of movement presents a problem.

THE PRIOR ART

The present invention provides improvements in an accumulating table of the rotary type in which a large metallic disk operates as a turntable tangent to an endless conveyor line so as to receive articles which for any reason cannot or should not proceed along the conveyor. The articles thus received accumulate on the disk while the conveyor system continues in operation until the large capacity of the disk is exhausted or the cause of the interruption in service is corrected, whereupon the articles may be fed back onto the conveyor.

The disks are commonly of the order of 4 to 5 feet in diameter, and in the prior art have regularly been made of very heavy steel plate which was thought necessary to provide the rigidity required to maintain the disk coplanar with the conveyor so that the transition of the articles in either direction across the point of tangency of disk and conveyor would be smooth and involve no damage, upsetting, rocking, tilting or other undesired movement of the articles. Such disks are very expensive and of great weight, requiring very heavy supporting framework and powerful drive means. Moreover, to fit such a disk into the required overlapping relation to the fixed trough bed in which the conveyor runs, with the disk surface flush with the conveyor surface and in substantial contact with the proximate side edges of the conveyor links, it has been necessary to chamfer the edge of the thick disk. All of these factors have contributed to the high cost of the apparatus, and all seriously militate against flexibility or versatility of the system to accommodate changes in articles, speed of movement and other altered conditions which would make desirable the substitution of a larger or smaller disk with correspondingly changed capacity.

GENERAL OBJECTS OF THE INVENTION

The general purpose of the present invention is to provide an accumulating table disk at unprecedentedly low cost which will make possible quick and permanent adjustment of the disk margin to accurate coplanar level relation with the conveyor surface at the point of tangency, in a supporting and drive structure and apparatus onto which disks of different diametric size are readily interchangeable.

THE SPECIFIC DISCLOSURE

The foregoing and other desirable related objects are achieved by the apparatus illustrated in the accompanying drawings which have been found entirely satisfactory in actual service and which is presented in this application for letters patent as exemplary of the invention, constituting the presently preferred embodiment of the invention and the inventive principles that are defined by the appended claims.

THE DRAWINGS

In the drawings:

FIG. 1 is a vertical sectional view taken on the line 1—1 of FIG. 4, substantially diametrically through the disk of an accumulating table constructed according to the invention, shown mounted on its supporting frame;

FIG. 2 is a detail vertical sectional view similar to that of FIG. 1 but showing, in somewhat exaggerated degree, the preloading effect in deforming the disk into low-altitude conical shape;

FIG. 3 is a top plan view, on a smaller scale, showing the tangential plane relationship of the table and a straight line supply conveyor;

FIG. 4 is a top plan view, on the scale of FIG. 1, partly broken away, showing a large diameter disk operatively mounted on the supporting frame;

FIG. 5 is a detail elevational view, taken on the line 5—5 of FIG. 4, showing one of the disk margin level adjusting rollers;

FIG. 6 is a detail axial sectional view, taken on the line 6—6 of FIG. 4, showing the central supporting bearing for the disk;

FIG. 7 is a top plan view, generally like that of FIG. 4 but on a smaller scale, showing a small diameter disk operatively mounted on the supporting frame;

FIG. 8 is a vertical sectional view taken through the disk margin on the line 8—8 of FIG. 7, showing in side elevation the disk margin level adjusting roller of FIG. 5;

FIG. 9 is a similar vertical sectional view, taken on the line 9—9 of FIG. 7, showing in side elevation another of the disk margin level adjusting rollers;

FIG. 10 is a vertical sectional view taken through the disk margin, on the line 10—10 of FIG. 4, similar to the view in FIG. 8 but showing the roller bracketed for cooperation with the larger diameter disk shown in FIG. 4; and FIG. 11 is a vertical sectional view taken through the disk margin, on the line 11—11 of FIG. 4, similar to the view of FIG. 9 but showing the roller bracketed for cooperation with the larger diameter disk shown in FIG. 4.

EXPLANATION OF THE DRAWINGS

Referring now to the drawings: the reference numeral 1 designates generally a conveyor of any kind for moving along a generally horizontal plane, in a straight or curved path, a series of articles 2 from some point of origin (not shown) to some point or station 4, incident to the handling of the articles in their manufacture, processing, etc. It may be assumed for the purpose of illustrating the invention that the conveyor is typically a straight line endless belt type made up of interengaged flat-topped plastic links 6, as shown in FIG. 4, moving between sidewalls 8 erected for confining such articles as the glass containers or similar ware suggested at 2 in FIG. 1. At a point where relief from congestion of the articles is desired, one of the sidewalls is interrupted to provide a point, designated 10 in FIGS. 1, 3 and 4, at which the disk of the new accumulating table may be set up tangent to the conveyor for the purpose of receiving from the conveyor articles 2, or returning such articles back to the conveyor, with the articles in either case passing through the opening in the conveyor wall at the point of tangency 10.

The particular conveyor shown here to illustrate the use of the invention has a supporting trough 12 indented in the bottom of an inverted channel or equivalent 14 along which the links 6 move, with the surface of the links protruding slightly above the level of the trough side margins, as shown at 16 in FIG. 1.

Figure 7:
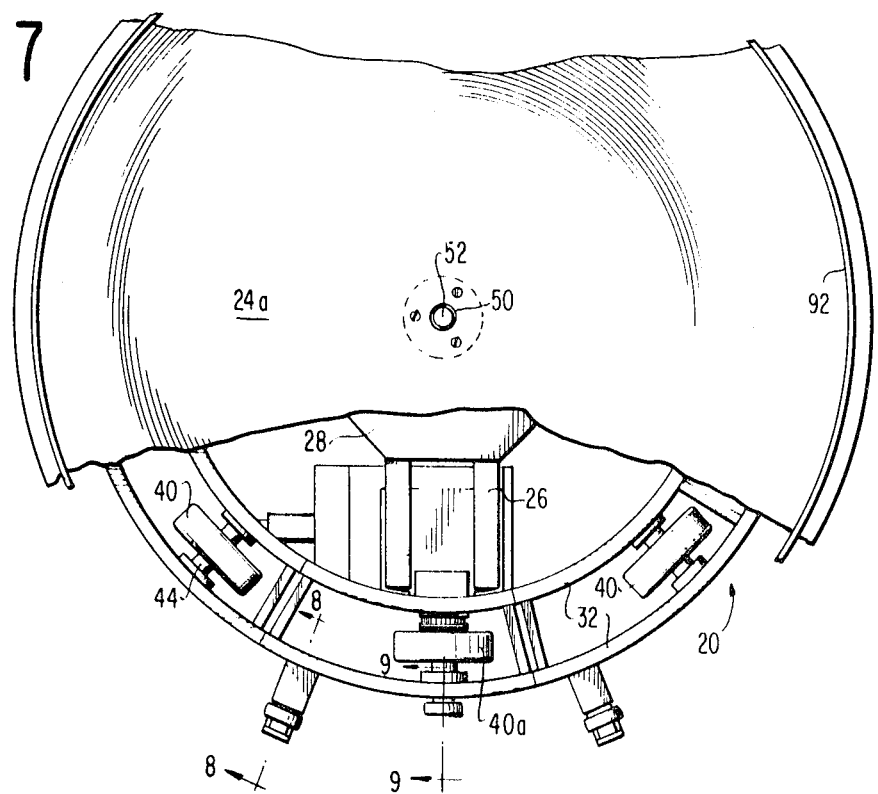

The table structure provided by the invention comprises a supporting frame designated generally 20, which may include legs 22 provided with telescoping parts of other arrangements for regulating and adjusting the level and height of the disk 24 that is to be mounted on the frame. The upper portion of the frame is provided with suitable crossmembers arranged to form a stout support for the disk 24, and the mounting and drive assembly for the disk. In the specific embodiment of the invention shown, the upper portion of the frame is made up of channel members 26 paired together to constitute strong box beams which radiate from upper and lower central plates 28, 30, to concentric radially spaced rings 32, 32 which are mounted directly on the tops of the leg structures 22.

The required result, whether achieved in the foregoing manner or otherwise, is the provision of a strong and solid support and rotary drive means for the disk 24 which, in the specific example shown in the drawings, is accomplished as follows:

At circumferentially spaced locations in the circle formed between the two rings 32, 32, idle rollers 40 are mounted on shafts 42 journaled in bearings 44 which are welded to the inner walls of the rings, as best shown in FIG. 1. Preferably eight of such rollers are provided, at equal spacings, all being of the same size, and all identical in mounting except one, located at the point of tangency 10, as hereinafter will be explained.

The topmost points on the surfaces of the rollers 40 all lie in the same horizontal plane and provide support for the marginal portions of the disk 24 which rests on the rollers, as shown in FIG. 1.

The disk is made of sheet metal, preferably steel or stainless steel one-eighth inch thick and having a diameter of 48 or 60 inches. The disk shown in FIG. 4 is 48 inches in diameter. The disk in FIG. 7 is 60 inches in diameter. In either case the disk is flexible by reason of its thin gauge, coupled with the fact that it is devoid of support except on the rollers 40 at its marginal zone, and at its center, as will now be described.

The disk is formed at its center point with a hole 50 through which a post 52 stands. The bottom of the post 52 is threaded into a post 54 of larger diameter which has its upper portion fastened to the inner race of an antifriction step bearing 56, the outer race of which is bolted to the underside of the disk, all as shown in FIG. 6. The post 54 projects down through an opening in the upper plate 28, terminating above the lower plate 30, and having a screw 57 threaded axially into it and extending through a nut 58 which is welded onto the lower plate 30, through the plate, and through and adjusting clamp nut 59. The terminal end of the screw 57 is slotted for turning by a screwdriver.

It will be evident that the foregoing construction makes it possible, by use of a screwdriver on the screw 57 and appropriate loosening and tightening of the clamp nut 59, to apply downwardly directed tension to the post 54 and hence also to the bearing 56 and the central area of the disk 24, so as to pull the marginal zone of the disk down onto the rollers 40 and deform the disk into the flattened, slightly conical or dished shape shown on a somewhat exaggerated scale in FIG. 2.

Preloading the disk in this manner imports into it a degree of stiffness considerably enhanced over that of the disk in unstressed condition and makes the thin, relatively inexpensive disk fully capable of providing proper support for all the articles 2 that it may be required to hold.

The disk is driven in rotation about its central axis by a suitable arrangement of electric motor and reducing gear 60, including a sprocket chain 62 trained over a sprocket 64 keyed to the shaft 65 on which is fixed one of the rollers 40, designated 40a in FIGS. 1, 4, and 7, which thus functions as a drive for rotating the disk by its frictional engagement with the under surface of the disk in its marginal zone.

Because preloading the disk induces the slight deformation to flat inverted conical shape, the peripheral edge of the disk becomes elevated above its normal height and the adjacent margin of the disk assumes a slight angle with the horizontal. This elevation and angle would be objectionable at the point of tangency 10 with the conveyor 1 by introducing a step, or difference in level between the conveyor and disk surfaces, over which the articles 2 might not be able properly to pass. It is vital to successful operation in many uses of the apparatus that the conveyor and disk surfaces be maintained quite accurately coplanar and flush at the point of tangency. It is not important that the disk surface be at the same level or height throughout its whole extent, i.e., at areas elsewhere on its periphery or in the interior zone.

Figure 11:
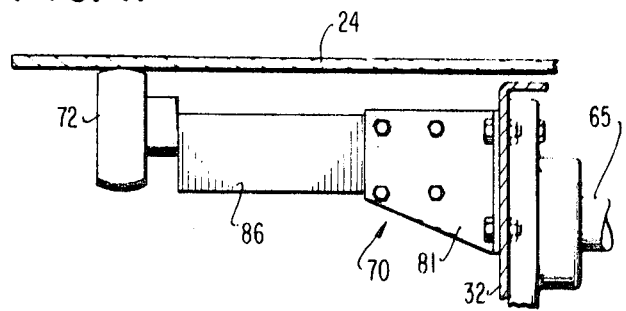
Figure 10:
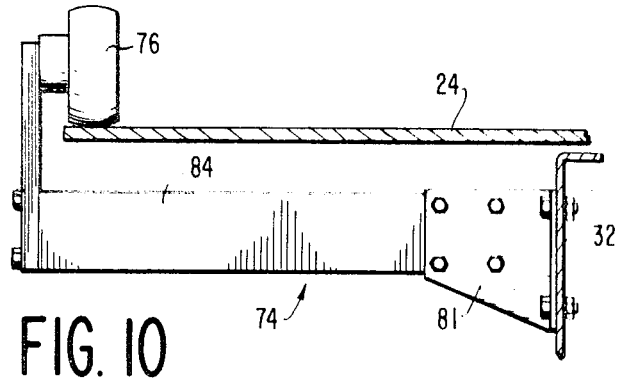

The required accurate coplanar relation of the conveyor and disk surfaces at the point of tangency 10 is achieved, as best shown in FIGS. 1 and 4, by providing abutments, three in number, mounted on the framework 20, spaced peripherally a short distance from each other, the two outer abutments bearing on one surface of the disk margin, and the intermediate abutment bearing on the other surface of the disk margin. The preferable arrangement comprises an intermediate bracket 70 bolted to the outer ring 32 with an idle roller 72 journaled on an axis radiating from the disk center in the line of the point of tangency 10, and two outer brackets 74, each with an idle roller 76 similarly journaled, as best shown in FIG. 4 and FIG. 11 (bracket 70 and roller 72) and FIG. 10 (bracket 74 and roller 76). As shown in these views, the roller 72 mounted on the intermediate bracket 70 in the line of the point of tangency 10 engages the undersurface of the disk margin, and the rollers 76 mounted on the outer brackets 74 engage the upper surface of the disk margin.

Each of the rollers 72, 76, 76 has its axis of rotation made adjustable up and down by a familiar type of eccentric bearing 80 as shown (in the case of the roller 76) in FIG. 5. By turning the slotted end of this bearing device the roller may be set adjustably up or down through a sufficient range to hold the disk margin up accurately to the level of the conveyor surface at the point of tangency 10 (in the case of the roller 72), while the rollers 76 in the two outer brackets 74 hold the incoming and outgoing portions of the disk margin down securely against the roller 72 as those portions approach and leave the point of tangency. The effect of course involves a flexing of the disk margin to some degree down under the first outer roller 76, then up over the intermediate roller 72, and then down again under the second outer roller 76. This flexing has no effect, objectionable or otherwise, on the ability of the disk to receive and hold articles, and to deliver them when required.

It will be noted that the disk 24 shown in FIGS. 1 and 4 is diametrically larger than the otherwise similar disk designated 24a in FIG. 7 and that both disks are mounted on identical supporting framework and ancillary rollers, drive, etc. In actual practice, in the commercial embodiments of the invention, the disk 24 is 60 inches in diameter and the disk 24a is 48 inches in diameter. This capacity of the framework, etc., to have mounted either of the two-sized disks interchangeably on it is a feature of great advantage because changing work conditions of various kinds, including use with different kinds and/or sizes of articles 2, require or make highly desirable a change in table capacity.

Figure 8:
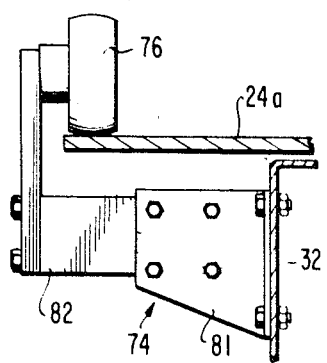

In the presently disclosed embodiment of the invention this versatility is achieved by providing brackets 70 and 74 each in two different lengths. In each case the bracket comprises a base portion 81 in the form of an inverted channel element having its inner end outwardly flanged for bolting to the outer ring 32 of the frame 20 and an extension member that is telescopically received in the base portion and bolted to it, carrying a roller 76 on its distal end and being short in length as shown at 82 in FIG. 8 for accommodating the smaller disk, and being longer, as shown at 84 in FIG. 10 for use with the larger disk.

Figure 9:
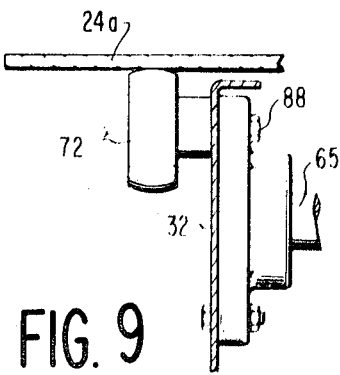

The arrangement for the roller 72 is similar. In FIG. 11 an extension member 86 is shown for use with the larger diameter disk. In FIG. 9 the roller 72 is shown mounted in position for use with the smaller diameter disk. It is convenient in this case to omit the base portion 81 altogether and to journal the roller on a shaft consisting of one of the bolts 88 which secure the outer bearing for the drive roller 40a to the outer ring.

It is believed the operation of the table will be obvious.

When shunting of articles onto the table is required, a deflector bar or its equivalent 90, FIG. 3, is set up in the conveyor 1 so as to feed oncoming articles 2 over the point of tangency 10 and onto an area of the disk 24 within the surrounding guardrail 92. The articles move about the rail as the disk rotates, the dished or slight conical shape of the disk tending to bias the circularly moving articles toward the center of the disk. The post 52, being stationary, is well adapted to have a plowing member of any desired kind secured to it. Movement of the articles off the disk back onto the conveyor is accomplished by appropriately adjusting the deflector bar 90, as will be understood.

When substitution of a larger of smaller disk is desired, it is a simple matter to unscrew the clamp nut 59, lift the disk off its supporting rollers, replace the bracket extension portions 82, 84, 86 with longer or shorter ones, and then set the substitute disk on the rollers, followed by adjustment of the screw 57 and the eccentric bearings 80 of the rollers 72, 76.

It is to be recognized that changes, omissions, and additions within the spirit of the invention may be made in the foregoing preferred embodiment without departing from the principles of the invention as defined by the appended claims.

I claim:

1. In a conveyor and rotary accumulating table system, the improvement comprising
   a supporting frame for the table,
   a circular metallic disk that is relatively flexible,
   means supporting said disk on said frame for rotation about a vertical axis in tangential relation to the conveyor,
   abutment elements bearing vertically on opposite side surfaces of the peripheral margin of the disk in one direction at the point of tangency and in the opposite direction at two points peripherally spaced a short distance from said point, and
   means adjustably fixing the elevation of the center of the disk in the frame so that the disk is preloaded and the peripheral margin is flexed as it passes said point of tangency,
   thereby maintaining the margin pressed against the abutment element at said point and insuring coplanar level of said margin and conveyor.

2. A rotary accumulating table as claimed in claim 1 in which
   the abutment elements are rollers, comprising one roller on which the undersurface of the margin of the disk bears down at the point of tangency with the conveyor and
   two rollers bearing down on the upper surfaces of the disk at points peripherally spaced a short distance on opposite sides of said point.

3. A rotary accumulating table as claimed in claim 1 in which
   the disk is driven in rotation by a drive roller frictionally engaging the undersurface, of the disk in the peripheral margin thereof.

4. A rotary accumulating table as claimed in claim 1 in which
   the last-named means is a post rotatably secured to the disk in the rotational axis thereof and depending from the disk in vertically fixed relation thereto,
   in combination with means mounting the post for vertical adjustment in the frame,
   whereby adjustment of the post is operative to deform the disk into shallow dished shape with the peripheral margin adjustably pressed onto an abutment element at the point of tangency with the conveyor.

5. A rotary accumulating table as claimed in claim 4 in which
   the abutment elements are rollers, including one roller on which the undersurface of the margin of the disk bears down at the point of tangency with the conveyor and two rollers bearing down on the upper surface of the disk at points peripherally spaced from said point,
   and said means fixing the elevation of the center of the disk in the frame is a post rotatably secured to the disk in the rotational axis thereof and depending from the disk in vertically fixed relation thereto,
   in combination with means mounting the post for vertical adjustment in the frame,
   whereby adjustment of the post is operative to deform the disk into shallow dished shape with the peripheral margin adjustably pressed onto a roller at the point of tangency with the conveyor.

6. A rotary accumulating table comprising
   a supporting frame,
   a plurality of rotatable rollers of uniform diameter mounted in said frame on peripherally spaced coplanar horizontal axes radiating from a common center,
   a relatively flexible disk having its peripheral margin supported on said rollers,
   drive means for rotating said disk about said center,
   and abutment elements bearing vertically on opposite surfaces of the peripheral margin of the disk in one direction at a point at which the disk is adapted to be located tangent to a conveyor and in the opposite direction at two points peripherally spaced a short distance from said point.

7. A rotary accumulating table comprising
   a supporting frame,
   a plurality of rotatable rollers of uniform diameter mounted in said frame on peripherally spaced coplanar horizontal axes radiating from a common center,
   a relatively flexible disk having its peripheral margin supported on said rollers,
   one of said rollers supporting the undersurface of the disk and being located at a point at which the disk is adapted to be positioned tangent to a conveyor,
   means for deforming the central area of the disk down with said undersurface adjustably pressed down onto said one roller,
   and drive means for rotating the disk about said center.

8. A rotary accumulating table as claimed in claim 7, including
   two additional rollers peripherally spaced a short distance on opposite sides of said point, each bearing down on the upper surface of the peripheral margin of the disk.

9. A rotary accumulating table as claimed in claim 8, in which
   said one roller and said two additional rollers are radially adjustable for positioning at selected different distances from the axis of rotation of the disk,
   whereby disks of different diametric size may be interchangeably mounted on the supporting rollers with setting of said three rollers corresponding to the individual disk size.

* * * * *